(12) United States Patent
Chakraborty et al.

(10) Patent No.: US 9,135,189 B2
(45) Date of Patent: Sep. 15, 2015

(54) DELIVERING GPU RESOURCES ACROSS MACHINE BOUNDARIES

(75) Inventors: Parag Chakraborty, Sunnyvale, CA (US); Bradley Stephen Post, San Francisco, CA (US); Vladimir Pavlov, San Jose, CA (US); B. Anil Kumar, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 930 days.

(21) Appl. No.: 13/227,101

(22) Filed: Sep. 7, 2011

(65) Prior Publication Data

US 2013/0057560 A1 Mar. 7, 2013

(51) Int. Cl.
*G06T 1/20* (2006.01)
*G06F 13/14* (2006.01)
*G06F 9/455* (2006.01)

(52) U.S. Cl.
CPC ............ *G06F 13/14* (2013.01); *G06F 9/45533* (2013.01); *G06T 1/20* (2013.01); *G06F 2009/4557* (2013.01)

(58) Field of Classification Search
CPC ....... G06T 1/20; G06F 9/455; G06F 9/45533; G06F 2009/4557
USPC .......................................... 345/501; 709/203
See application file for complete search history.

(56) References Cited

U.S. PATENT DOCUMENTS

| 7,372,465 | B1* | 5/2008 | Tamasi et al. ................. 345/502 |
| 7,944,450 | B2 | 5/2011 | Bakalash et al. |
| 8,169,436 | B2* | 5/2012 | Rivera et al. .................. 345/419 |
| 8,405,666 | B2* | 3/2013 | Masood ....................... 345/530 |
| 2009/0201303 | A1 | 8/2009 | Westerhoff et al. |
| 2009/0305790 | A1* | 12/2009 | Lu et al. ......................... 463/42 |
| 2010/0253697 | A1* | 10/2010 | Rivera .......................... 345/589 |
| 2011/0063306 | A1 | 3/2011 | Diard |
| 2011/0084973 | A1 | 4/2011 | Masood |
| 2011/0102443 | A1 | 5/2011 | Dror et al. |
| 2011/0157193 | A1 | 6/2011 | Boucher et al. |

OTHER PUBLICATIONS

Kindratenko et al., "GPU Cluster for High-Performance Computing", Proceedings: IEEE International Conference on Cluster Computing and Workshops, Cluster '09, Aug. 31, 2009, 8 pages.
Shi et al., "vCUDA: GPU Accelerated High Performance Computing in Virtual Machines", Proceedings: IEEE International Symposium on Parallel & Distributed Processing (IPDPS), May 23-29, 2009, 1-11.

\* cited by examiner

*Primary Examiner* — Joni Richer
(74) *Attorney, Agent, or Firm* — Kate Drakos; Henry Gabryjelski; Micky Minhas

(57) ABSTRACT

Described herein is providing GPU resources across machine boundaries. Data centers tend to have racks of servers that have limited access to GPUs. Accordingly, disclosed herein is providing GPU resources to computing devices that have limited access to GPUs across machine boundaries.

13 Claims, 11 Drawing Sheets

DELIVERING GPU RESOURCES ACROSS MACHINE BOUNDARIES

BACKGROUND

Graphics processing units (GPUs) have been standard offerings on most PCs for several years. The graphics processing units are usually specialized circuits designed to rapidly process information to accelerate the building of images in a frame buffer for display. GPUs are also becoming increasingly common in mobile phones and game systems. They are generally adapted to process computer graphics more effectively than general purpose central processing units (CPUs).

Data centers tend to have highly specialized hardware. Highly specialized hardware can be valuable for various reasons. First, the processing in data centers is historically centered on server workloads, such as filing and saving data. Thus, designers and manufacturers of data center servers focused hardware on those specific workloads. As hardware was focused on workloads, components that were unnecessary for those workloads were not included in the servers. It is also known that, if you have a rack of servers, it may be useful for physical space, heating, and power requirements to have specific type of hardware on a specific rack. If every component on a rack is a general CPU with basic supporting components, the power requirements, dimensions of the components and the like will all be simple and standard. As such, current data centers have been designed such that GPUs cannot be on the same rack as the servers.

Remote desktop applications such as Remote FX have a virtualized graphic device that lives in a child virtual machine that communicates with a host partition. The host partition has the physical GPU, and all of this is contained in one box. As such, although it is possible to provide a remote desktop with offerings like remote FX, data centers, server racks and current server design are not suited for GPU applications and/or remote desktop applications.

SUMMARY

There is a need for GPU resources in data centers. Further, there is a need for an architecture that integrates GPU resources with existing server systems that lack GPU resources. Included herein are GPU resources allocated across machine boundaries.

In an embodiment, a host computer in a data center may be running an application. The host computer may lack sufficient resources to perform one or more GPU tasks. The application may issue an instruction. The host computer may determine that the instruction is to be processed by one or more external GPUs. The host computer may send information indicative of a request for a GPU processing task to a graphics server manager. The graphics server manager may be associated with one or more GPU host machines. One or more of the GPU host machines may mount a state; process one or more GPU processing tasks and return the processed GPU task to the host computer.

In another embodiment, a data center comprises one or more servers. The one or more servers may be configured as a host machine for one or more virtual machines. Each virtual machine can communicate with a client computing device and each VM may be configured to run one or more applications on behalf of the client computing device. Applications run on behalf of a client computing system can include, as one example, a remote desktop session.

The one or more servers may not have GPUs integrated internally with the server. Accordingly, when a first virtual machine provides a first instruction that is to be processed by a GPU, the host machine may be configured to request GPU resources from a graphics server manager. The graphics server manager may be integrated with a Host GPU machine or it a computing device separate from the server and the graphics server manager can be associated with one or more GPU components. The host machine can send the first instruction to the graphics server manager. The graphics server manager receives the first instruction, and allocates one or more proxy graphics applications associated with one or more GPU components to perform the instructions. The proxy graphics applications may each have a graphics device driver that can be configured to work in the format specified by, for example, the virtual machine. The graphics device driver may be in communication with a graphics device driver in the kernel of the GPU resources component, which may cause GPU hardware to perform the instruction. The kernel level graphics device driver can send the processed instruction to the proxy graphics application, which, in turn sends the processed instruction to the graphics server manager, which send the instruction back to the host machine.

In an embodiment, a first set of one or more GPUs may be associated with a state and may be performing one or more GPU processing tasks for a server application on a host machine. As an example, the server application may be a virtual machine rendering a desktop for an end user. The one or more GPUs may be managed and monitored by a graphics server manager. The graphics server manager may determine that the resources allocated for the GPU processing task are insufficient to perform the task. In such an embodiment, the graphics server manager may allocate additional resources for the GPU processing task, mount a state of the first set of one or more GPUs on a second set of one or more GPUs, divide the GPU processing task and route one or more instructions to perform the GPU processing task to both the first and the second set of one or more GPUs. In another embodiment, the graphics server manager may send data to the host machine, the data configured to route graphics processing instructions to the first and second set of one or more proxy graphics applications after both the first and seconds set of proxy graphics applications are associated with the state.

In another embodiment, a first set of one or more GPUs may be associated with a state and may be performing one or more GPU processing tasks for a virtual machine running on a first set of one or more servers. The virtual machine running on the first set of one or more servers may migrate from the first set of one or more servers to a second set of one or more servers. In such an embodiment, the GPU processing state may be maintained on the first set of one or more GPUs. As such, migrating a virtual machine may not be associated with a glitch for setting up a state in a set of GPUs and switching sets of servers.

In an embodiment similar to the one above, one or more servers may be running a virtual machine. The one or more servers may not have GPUs integrated internally with the server. Accordingly, when a first virtual machine provides a first instruction that is to be processed by a GPU, the host machine may be configured to request GPU resources from a graphics server manager. The graphics server manager may be integrated with a host GPU machine or it may be separate from the server and the GPU host machine and may be associated with one or more GPU components. The host sends a request to the graphics server manager. The graphics server manager reads the request and allocates GPU resources for the host machine. The resources allocate include at least one proxy graphics application, each proxy graphics application comprising a graphics device driver. As one example, the graphics device driver may be associated with a specific driver for an application, such as Windows 7, Windows Vista and the like. The proxy graphics application may receive the instruction directly from a graphics device driver associated with the host and the virtual machine. The proxy graphics application may send the instruction to a kernel layer graphics device driver, which may cause the instruction to execute on GPU hardware. The processed instruction may be sent from the hardware through the kernel to the graphics device driver on the proxy graphics application, which in turn may send the processed instruction to the host computer, the graphics driver units on the host computer and/or the virtual machine on the host computer.

A first virtual machine may be running on one or more host machines. The first virtual machine may be executing one or more processes that require a series of GPU processing tasks. For example, the first virtual machine may be rendering a desktop in real time for a thin client user. The GPU processing tasks may be executing on a remote GPU using a graphics server manager and a first set of one or more proxy graphics applications. In an embodiment, the graphics server manager, the host, or the proxy graphics application may determine that the GPU processing task is to be moved from the first set of one or more proxy graphics applications to a second set of one or more proxy graphics applications. In such an embodiment, a first set of one or more GPUs may be associated with one or more memories, the memories storing a state. Upon determining that the GPU processing task is to be moved from the first set of one or more proxy graphics applications to a second set of one or more proxy graphics applications, the state of the first set of one or more GPUs is copied by the graphics server manager and associated with a second set of one or more proxy graphics applications. After the state is prepared, the graphics processing task is dismounted from the first set of one or more proxy graphics applications and mounted on the second set of one or more proxy graphics applications. Accordingly, when shifting GPU resources, there is no glitch in the processing, preventing possible problems in rendering of a desktop, application, or even system crashes.

BRIEF DESCRIPTION OF THE DRAWINGS

The systems, methods, and computer readable media for deploying a software application to multiple users in a virtualized computing environment in accordance with this specification are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client.

Figure 1:
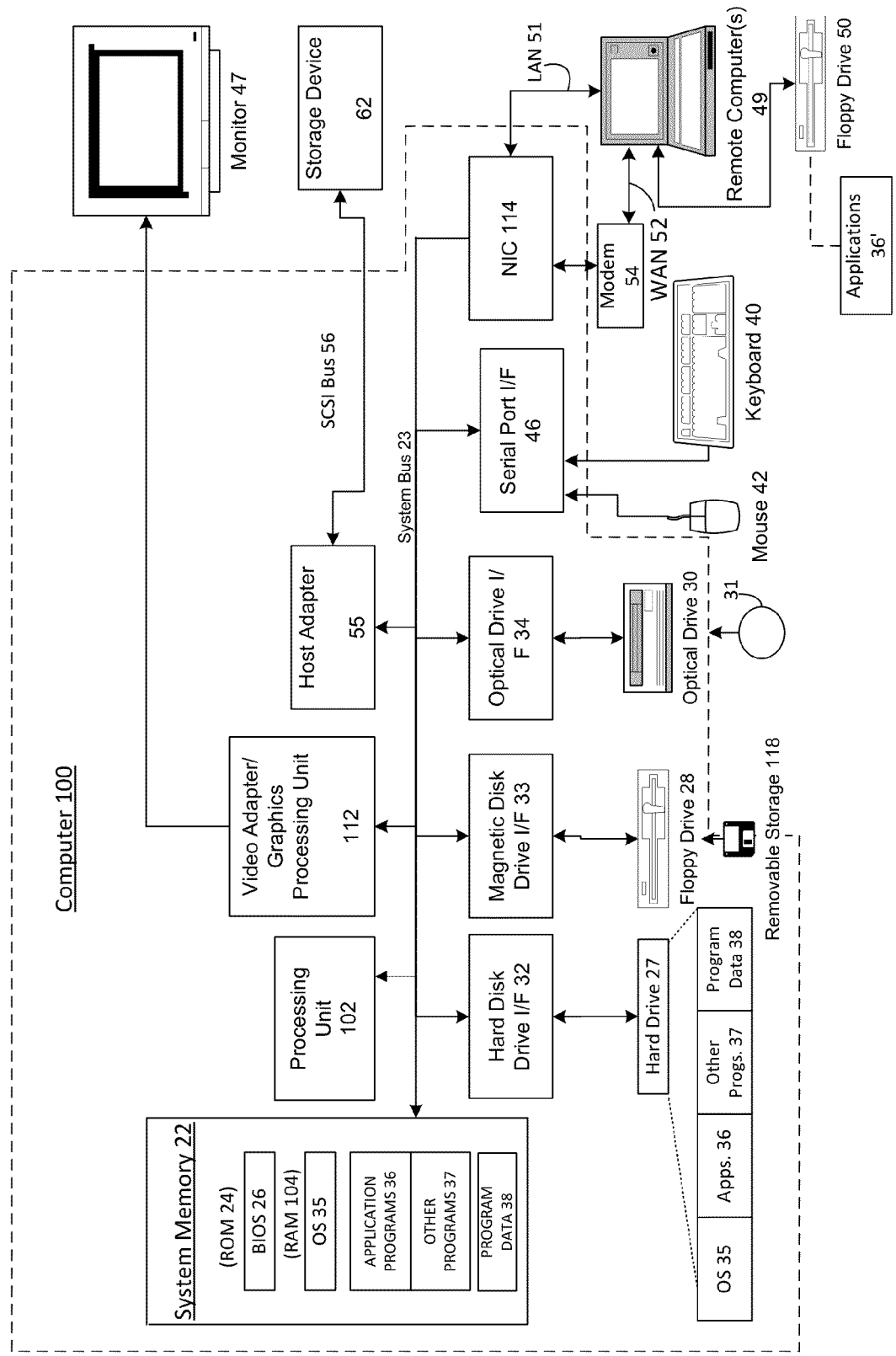
FIG. 1 depicts an example computing environment wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that computer system 200 can have some or all of the components described with respect to computer 100 of FIG. 1.

FIG. 1 depicts an example of a computing system which is configured to work with aspects of the disclosure. The computing system can include a computer 100 or the like, including a logical processing unit 102, a system memory 22, and a system bus 23 that couples various system components including the system memory to the logical processing unit 102. The system bus 23 may be any of several types of bus structures including a memory bus or memory controller, a peripheral bus, and a local bus using any of a variety of bus architectures. The system memory includes read only memory (ROM) 24 and random access memory (RAM) 104. A basic input/output system 26 (BIOS), containing the basic routines that help to transfer information between elements within the computer 100, such as during start up, is stored in ROM 24. The computer 100 may further include a hard disk drive 27 for reading from and writing to a hard disk, not shown, a magnetic disk drive 28 for reading from or writing to a removable magnetic disk 118, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 104, removable magnetic disk 118, optical disk 31, and/or a cache of logical processing unit 102. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the computer 100. Although the environment described herein employs a hard disk, a removable magnetic disk 118 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 118, optical disk 31, ROM 24 or RAM 104, including an operating system 35, one or more application programs 36, other program modules 37 and program data 38. A user may enter commands and information into the computer 100 through input devices such as a keyboard 40 and pointing device 42. Other input devices (not shown) may include a microphone, joystick, game pad, satellite disk, scanner or the like. These and other input devices are often connected to the logical processing unit 102 through a serial port interface 46 that is coupled to the system bus, but may be connected by other interfaces, such as a parallel port, game port or universal serial bus (USB). A display 47 or other type of display device can also be connected to the system bus 23 via an interface, such as a GPU/video adapter 112. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 100 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 100, although only a memory storage device 50 has been illustrated in FIG. 1. The logical connections depicted in FIG. 1 can include a local area network (LAN) 51 and a network 52, which, as one example is a wide area network (WAN). Such networking environments are commonplace in offices, enterprise wide computer networks, intranets and the Internet.

When used in a LAN networking environment, the computer 100 can be connected to the LAN 51 through a network interface controller (NIC) or adapter 114. When used in a WAN networking environment, the computer 100 can typically include a modem 54 or other means for establishing communications over the network 52, such as the Internet. The modem 54, which may be internal or external, can be connected to the system bus 23 via the serial port interface 46. In a networked environment, program modules depicted relative to the computer 100, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Turning to FIGS. 2(A-B), illustrated are exemplary virtualization platforms that can be used to generate the virtual machines used for virtual desktop sessions. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, hypervisor microkernel 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provides a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 2A:
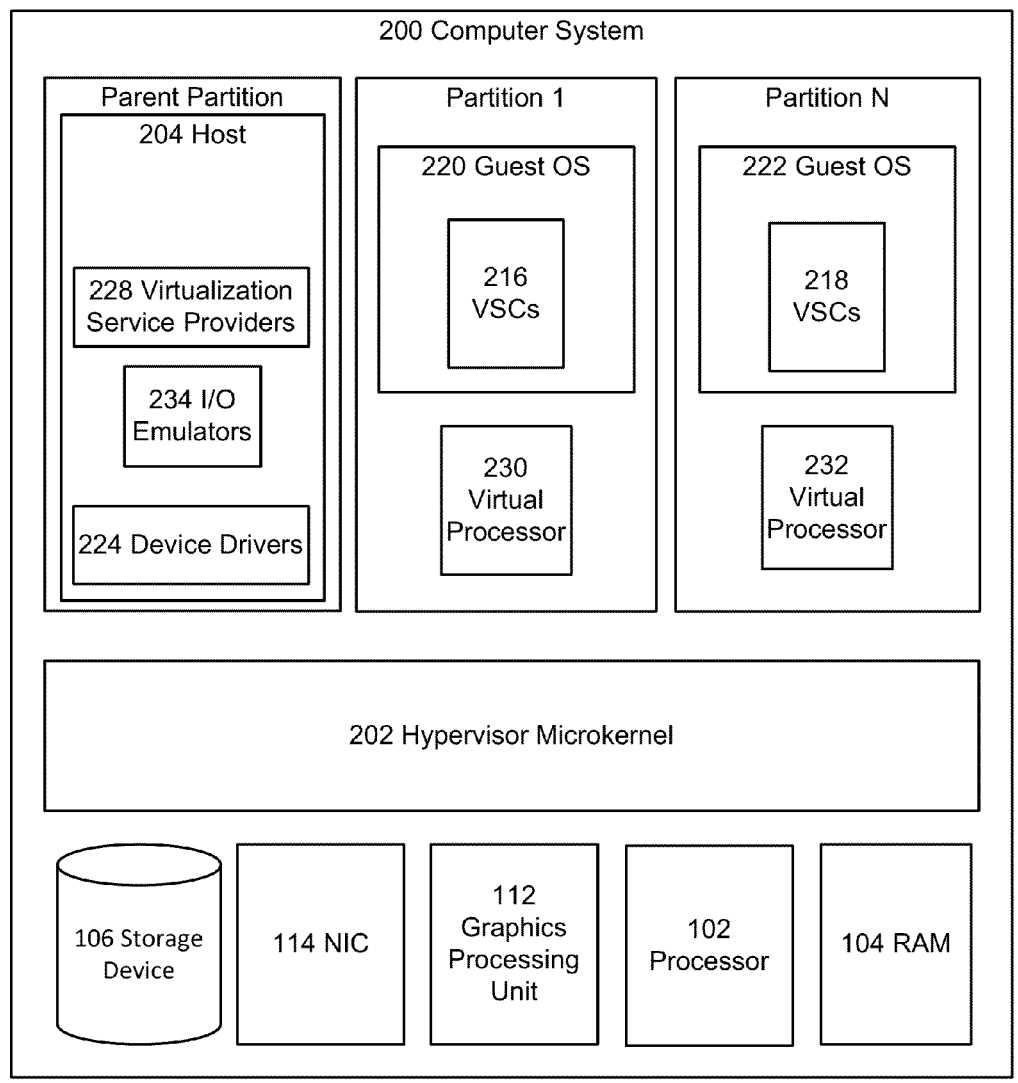
FIG. 2 depicts an example computing environment wherein aspects of the present disclosure can be implemented.
Figure 2B:
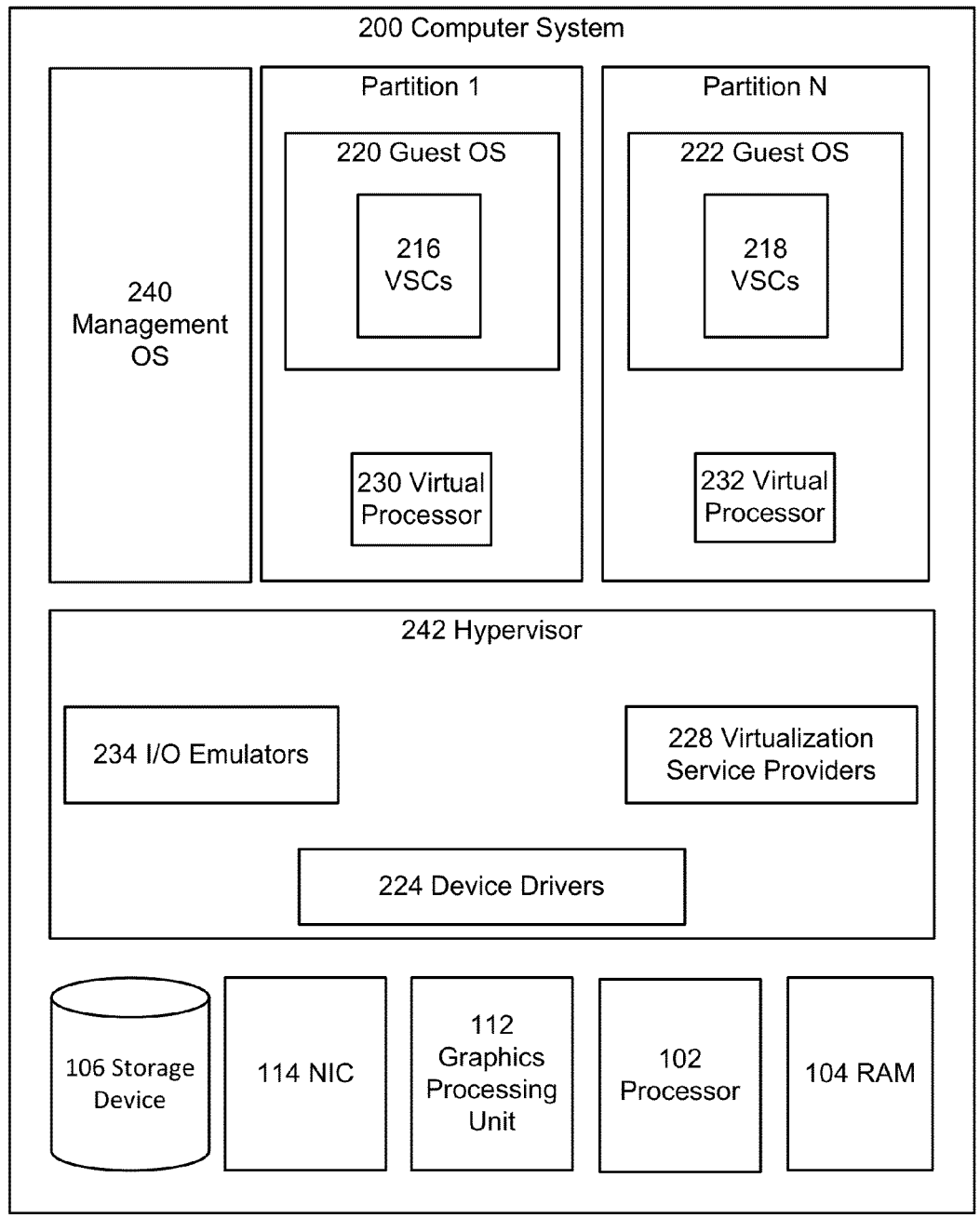

Referring now to FIG. 2(B), it depicts similar components to those of FIG. 2(A); however, in this example embodiment hypervisor 242 can include a microkernel component and components similar to those in host 204 of FIG. 2(A) such as the virtualization service providers 228 and device drivers 224, while management operating system 240 may contain, for example, configuration utilities used to configure hypervisor 242. In this architecture, hypervisor 302 can perform the same or similar functions as hypervisor microkernel 202 of FIG. 2(A) and host 204. Hypervisor 242 of FIG. 2(B) can be a standalone software product, a part of an operating system, embedded within firmware of a motherboard, and/or a portion of hypervisor 242 can be effectuated by specialized integrated circuits.

Figure 3:
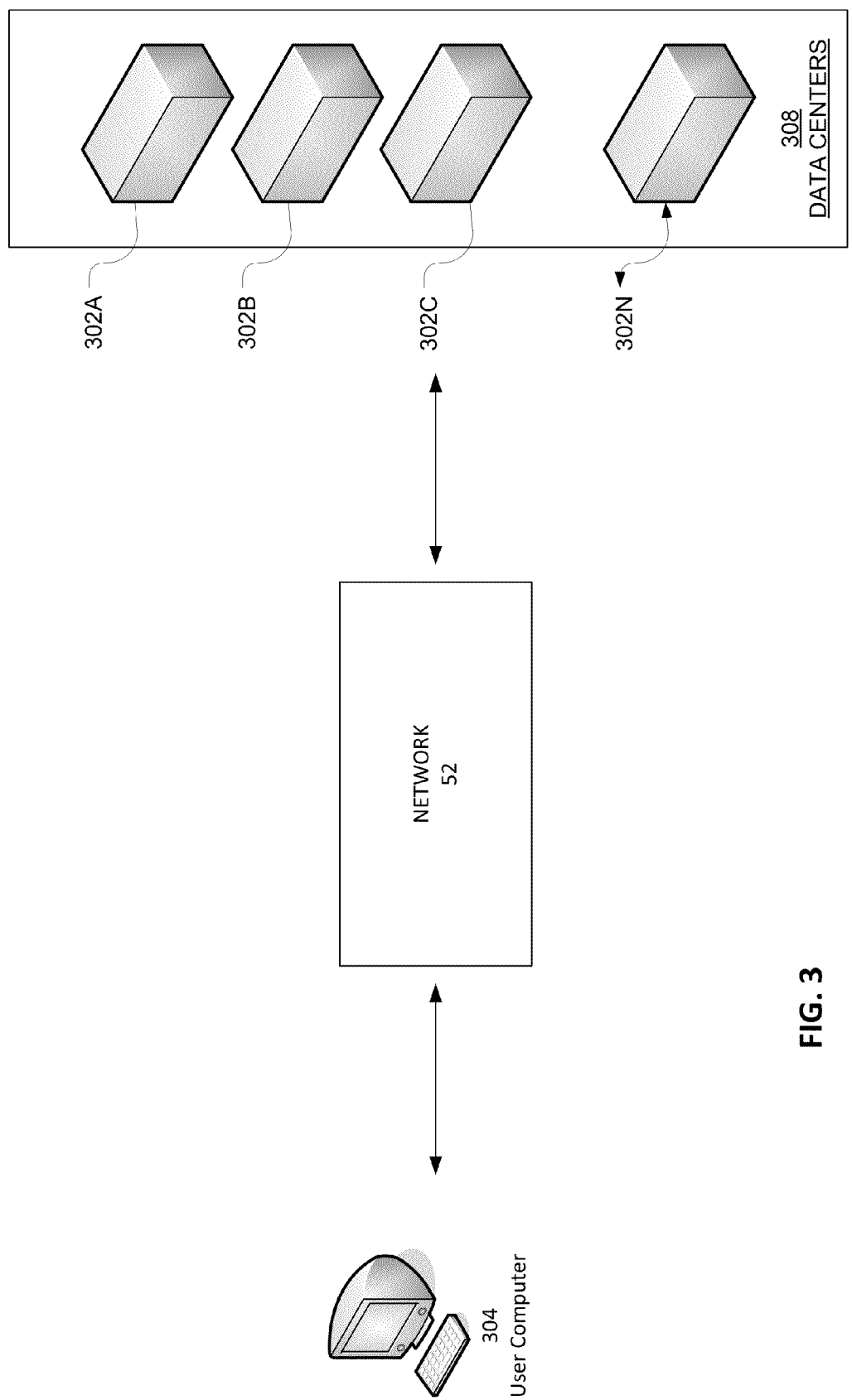
FIG. 3 depicts an example computing environment including data centers.

FIG. 3 and the following description are intended to provide a brief, general description of an example computing environment in which the embodiments described herein may be implemented. In particular, FIG. 3 is a system and network diagram that shows an illustrative operating environment that includes data centers 308 for providing computing resources. Data centers 308 can provide computing resources for executing applications and providing data services on a continuous or an as-needed basis. The computing resources provided by the data centers 308 may include various types of resources, such as data processing resources, data storage resources, data communication resources, and the like. Each type of computing resource may be general-purpose or may be available in a number of specific configurations. For example, data processing resources may be available as virtual machine instances. The virtual machine instances may be configured to execute applications, including Web servers, application servers, media servers, database servers, and the like. Data storage resources may include file storage devices, block storage devices, and the like.

Each type or configuration of computing resource may be available in different sizes. For example, a large resource configuration may consist of many processors, large amounts of memory, and/or large storage capacity, and a small resource configuration may consist of fewer processors, smaller amounts of memory, and/or smaller storage capacity. Users may choose to allocate a number of small processing resources as Web servers and/or one large processing resource as a database server, for example.

The computing resources provided by the data centers 308 may be enabled by one or more individual data centers 302A-302N (which may be referred herein singularly as "a data center 302" or in the plural as "the data centers 302"). Computing resources in one or more data centers may be known as a cloud computing environment. The data centers 302 are facilities utilized to house and operate computer systems and associated components. The data centers 302 typically include redundant and backup power, communications, cooling, and security systems. The data centers 302 might also be located in geographically disparate locations. One illustrative configuration for a data center 302 that implements the concepts and technologies disclosed herein for scalably deploying a virtualized computing infrastructure will be described below with regard to FIG. 3.

The users and other consumers of the data centers 308 may access the computing resources provided by the cloud computing environment 302 over a network 52, which may be a wide-area network ("WAN"), a wireless network, a fiber optic network, a local area network, or any other network in the art, which may be similar to the network described above with respect to FIG. 1. Although a network, which is depicted as a WAN, is illustrated in FIG. 1, it should be appreciated that a local-area network ("LAN"), the Internet, or any other networking topology known in the art that connects the data centers 302 to remote consumers may be utilized. It should also be appreciated that combinations of such networks might also be utilized.

The user computing system 304 may be a computer utilized by a user or other consumer of the data centers 308. For instance, the user system 304 may be a server computer, a desktop or laptop personal computer, a tablet computer, a wireless telephone, a personal digital assistant ("PDA"), an e-reader, a game console, a set-top box, or any other computing device capable of accessing the data centers 308.

The user computing system 304 may be utilized to configure aspects of the computing resources provided by the data centers 308. In this regard, the data centers 308 might provide a Web interface through which aspects of its operation may be configured through the use of a Web browser application program executing on the user computing system 304. Alternatively, a stand-alone application program executing on the user computing system 304 might access an application programming interface ("API") exposed by the data centers 308 for performing the configuration operations. Other mechanisms for configuring the operation of the data centers 308, including deploying updates to an application, might also be utilized.

FIG. 3 depicts a computing system diagram that illustrates one configuration for a data center 302 that implements data centers 308, including the concepts and technologies disclosed herein for scalably deploying a virtualized computing infrastructure. The example data center 302 A-N shown in FIG. 3 includes several server computers 402A-402N (which may be referred herein singularly as "a server computer 402" or in the plural as "the server computers 402") for providing computing resources for executing an application. The server computers 402 may be standard server computers configured appropriately for providing the computing resources described above. For instance, in one implementation the server computers 402 are configured to provide the processes 406A-406N.

In another embodiment, server computers 402A-402N may be computing devices configured for specific functions. For example, a server may have a single type of processing unit and a small amount of cache memory only. As another example, memory storage server computers 402 may be memory severs comprising a large amount of data storage capability and very little processing capability. As a further example, one or more GPUs may be housed as GPU processing server device. Thus servers 402 may be provided with distinctive and/or special purpose capabilities. The servers, memory storage server computers and GPU processing servers may be connected with each other via wired or wireless means across machine boundaries via a network.

As an example of the structure above, an application running in a data center may be run on a virtual machine that utilizes resources from one or more of the servers 402A, utilizing memory from one or more memory storage server 402 B, one or more GPU processing servers 402C, and so on. The virtual machine may migrate between physical devices, add devices and/or subtract devices. Accordingly, the data center may include the functionality of computing systems 100 and 200 noted above with respect to FIGS. 1-2(A-B) across machine boundaries. In an embodiment, sets of one or more computing devices may be managed by managing computing devices, such as a server manager, a memory manager, a GPU manager and the like. The managing devices may be used to determine when computing resources of a particular type need to be added or subtracted and may route information to devices that are performing processes.

In one embodiment, the processes 406A-406N (which may be referred herein singularly as "a process 406" or in the plural as "the processes 406") may be virtual machine instances. A virtual machine instance may be an instance of a software implementation of a machine (i.e., a computer) that executes programs much like a physical machine executes programs. In the example of virtual machine instances, each of the servers 402A may be configured to execute an instance manager capable of executing the instances. The instance manager might be a hypervisor or another type of program configured to enable the execution of multiple processes 406 on a single server 402A, utilizing resources from one or more memory storage servers 402B and one or more GPU servers 402C for example. As discussed above, each of the processes 406 may be configured to execute all or a portion of an application.

It should be appreciated that although some of the embodiments disclosed herein are discussed in the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances i.e. that use a combination of physical machines and virtual machines.

Figure 4:
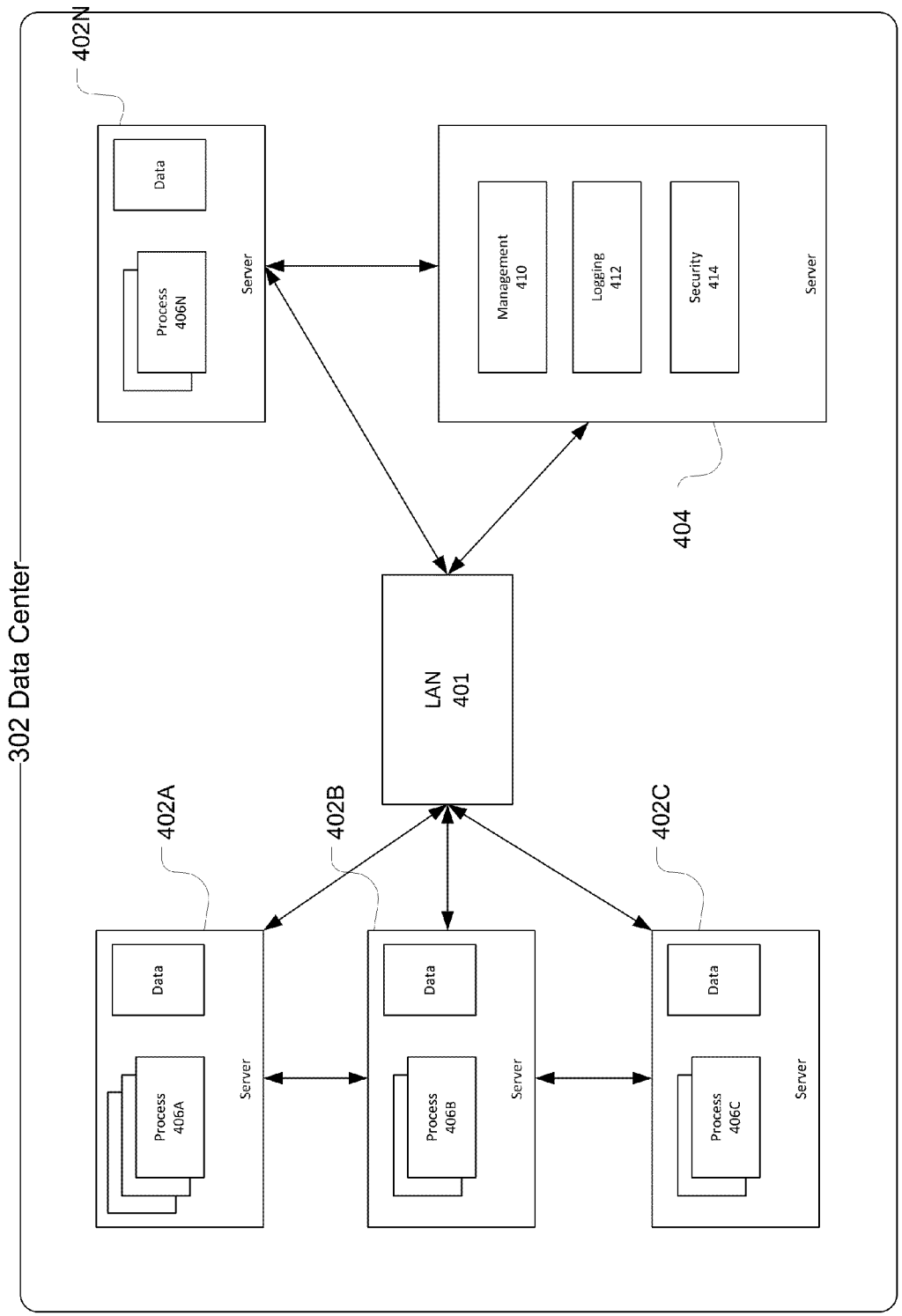
FIG. 4 depicts an operational environment of a data center.

The data center 302 A-N shown in FIG. 4 also may also include one or more managing computing devices 404 reserved for executing software components for managing the operation of the data center 302 A-N, the server computers 402A, memory storage server 402C, GPU servers 402C, and the resources associated with each 406. In particular, the managing computers 404 might execute a management component 410. As discussed above, a user of the data centers 308 might utilize the user computing system 304 to access the management component 410 to configure various aspects of the operation of data centers 308 and the instances 406 purchased by the user. For example, the user may purchase instances and make changes to the configuration of the instances. The user might also specify settings regarding how the purchased instances are to be scaled in response to demand.

In the example data center 302 shown in FIG. 4, an appropriate LAN 401 is utilized to interconnect the server computers 402A-402N and the server computer 404. The LAN 401 is also connected to the network 52 illustrated in FIG. 3. It should be appreciated that the network topology illustrated in FIGS. 4 and 5 has been greatly simplified and that many more networks and networking devices may be utilized to interconnect the various computing systems disclosed herein. Appropriate load balancing devices or software modules might also be utilized for balancing a load between each of the data centers 302A-302N, between each of the server computers 402A-402N in each data center 302, and between instances 406 purchased by each user of the data centers 308. These network topologies and devices should be apparent to those skilled in the art.

It should be appreciated that the data center 302 A-N described in FIG. 4 is merely illustrative and that other implementations might be utilized. Additionally, it should be appreciated that the functionality disclosed herein might be implemented in software, hardware, or a combination of software and hardware. Other implementations should be apparent to those skilled in the art.

Cloud computing generally refers to a computing environment for enabling on-demand network access to a shared pool of computing resources (e.g., applications, servers, and storage) such as those described above. Such a computing environment may be rapidly provisioned and released with minimal management effort or service provider interaction. Cloud computing services typically do not require end-user knowledge of the physical location and configuration of the system that delivers the services. The services may be consumption-based and delivered via the Internet. Many cloud computing services involve virtualized resources such as those described above and may take the form of web-based tools or applications that users can access and use through a web browser as if they were programs installed locally on their own computers.

Cloud computing services are typically built on some type of platform. For some applications, such as those running inside an organization's data center, this platform may include an operating system and a data storage service configured to store data. Applications running in the cloud may utilize a similar foundation.

In one embodiment and as further described in FIG. 5, a cloud service can implement an architecture comprising a stack of four layers as follows:

cloud computing platform configured to provide the resources to support the cloud services desktop provisioning and management layer for creating and managing the cloud computing assets that enable application providers to provide applications, enterprise desktop providers and desktop resellers to create and manage desktops, users to connect to their desktops, etc. This layer can translate the logical view of applications and desktops to the physical assets of the cloud computing platform.

an application provider/enterprise desktop provider/desktop reseller/user experiences layer that provides distinct end-to-end experiences for each of the four types of entities described above.

a vertical layer that provides a set of customized experiences for particular groups of users and provided by desktop resellers.

Figure 5:
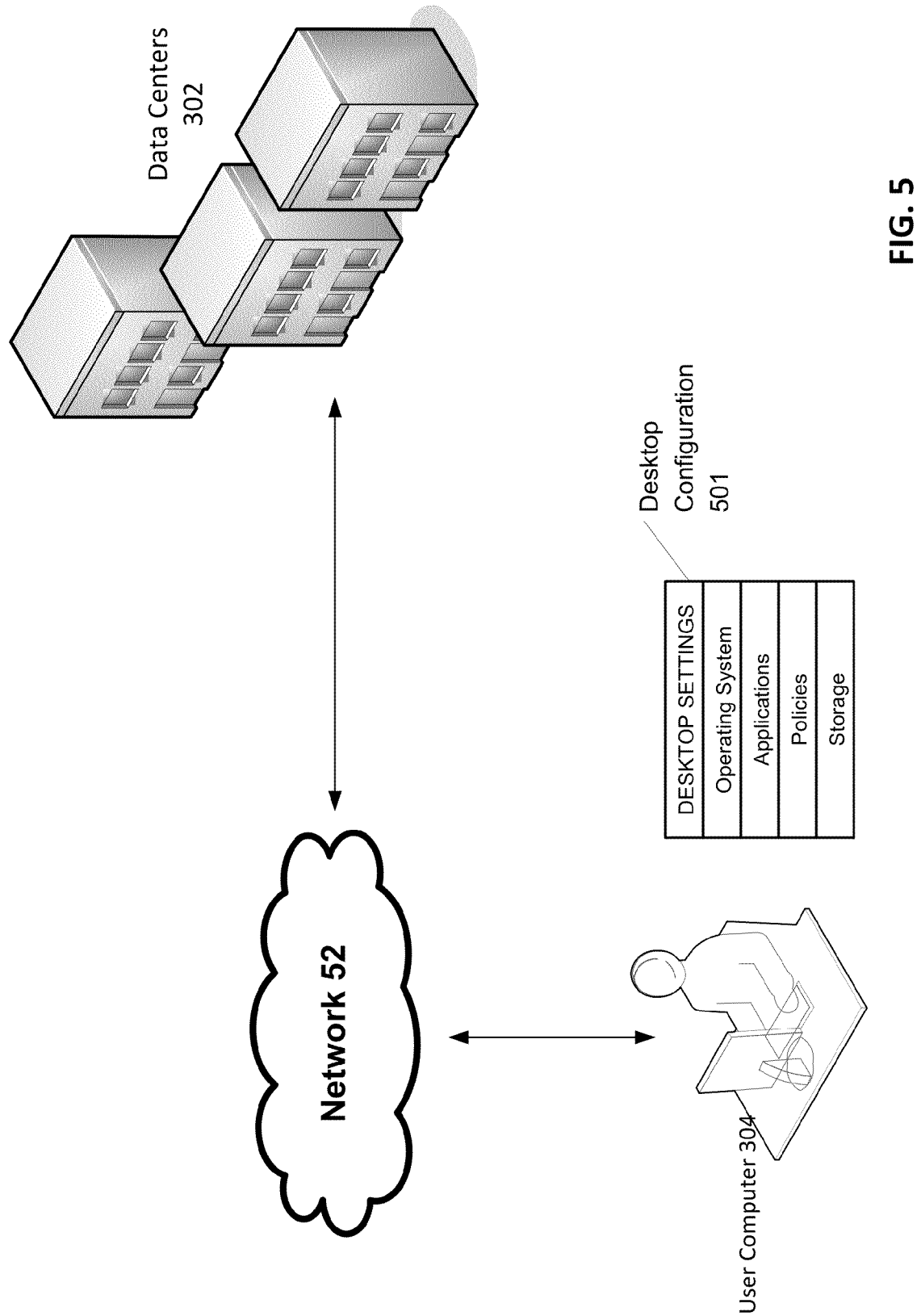
FIG. 5 depicts an operational environment for practicing aspects of the present disclosure.

FIG. 5 depicts another figure of a remote desktop/thin client application. A user computer 304, which can be computing systems 100, or 200 of FIGS. 1-2(A-B) acting in a remote desktop setting as a thin client is shown in contact via a network 52 with one or more data centers 302 A-N. The thin client may have certain configurations associated with the desktop, including desktop configuration 501. That configuration may include an operating systems, applications, policies and storage. The data center may be configured with drivers and settings necessary for compatibility with the desktop configuration 501. In an embodiment, desktop configurations 501 may dictate in part what set of servers, memories, GPUs and other computing resources at data centers 302 A-N a remote desktop is rendered on.

With regard to a remote desktop, a server may be associated with one or more applications requested by the client. The server access resources across one or more data centers and may render the entire desktop of the client with a virtual graphics driver. The desktop may then be flattened into a bitmap. The rendered bit can be compressed in one or more ways. As a first example, a bitmap may be compressed by comparing it to a previous rendering of a bitmap and determining the differences between the two bitmaps and only sending the differences. As another example, lossy or lossless compression formats may be used, such as run length encoding (RLE), BBC, WAH, COMPAX, PLWAH, CONCISE, LZW, LZMA, PPMII, BWT, AC, LZ, LZSS, Huff, f, ROLZ, CM, Ari, MTF, PPM, LZ77, JPEG, RDP, DMC, DM, SR, and bit reduction quantization. After compression, the server will send the compressed data in the form of payloads to the client. In response to receiving the payloads, the client may send a response to the server. The response may indicate that the client is ready to receive additional payloads or process more data.

Figure 6:
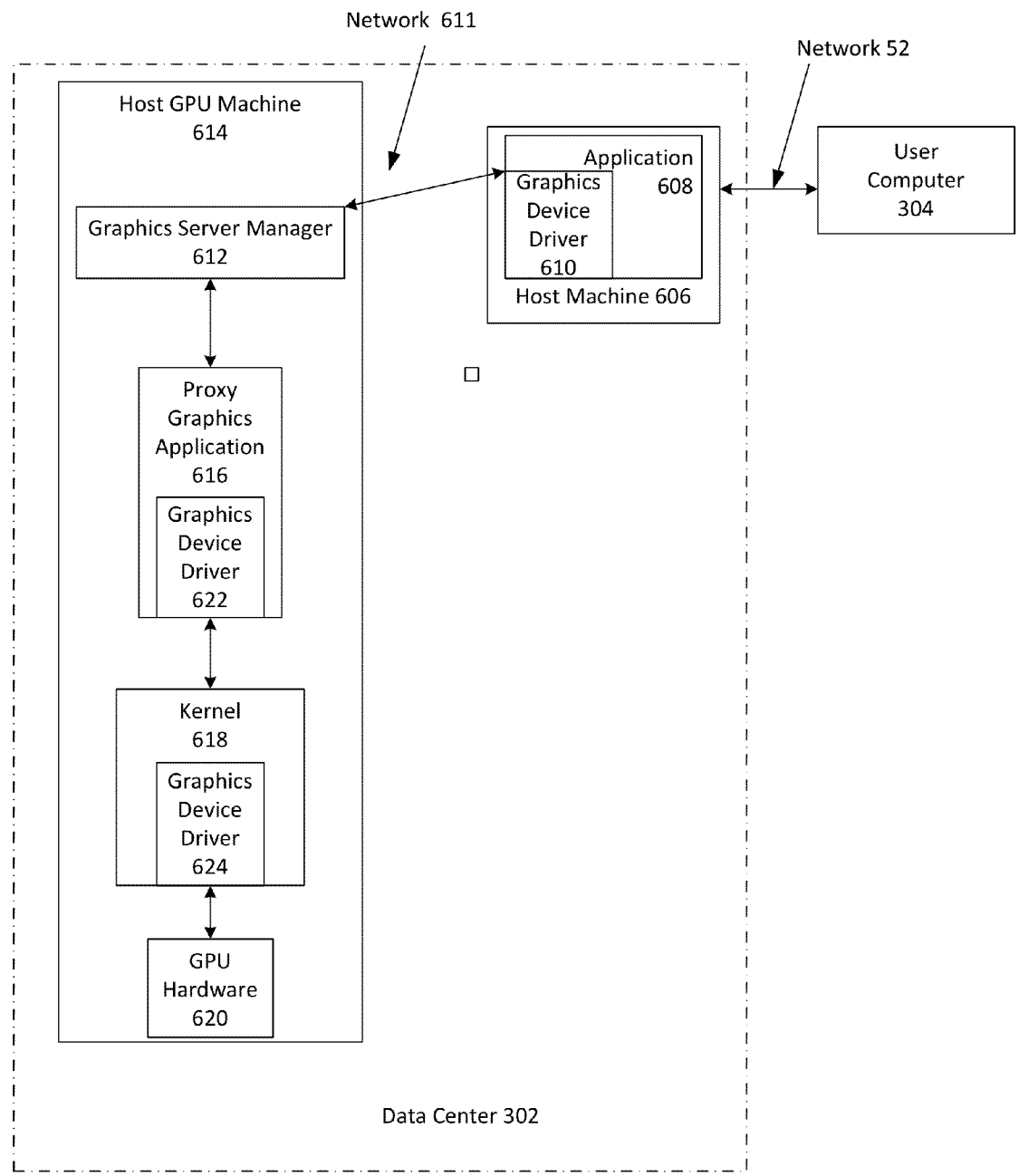
FIG. 6 depicts an example embodiment of providing GPU resources across machine boundaries.

FIG. 6 depicts an example embodiment for providing GPU resources to a server in a data center across machine boundaries. It should be noted that while FIG. 6 depicts a single data center, a plurality of data centers is also considered, where network 611 connects data centers in remote locations and where the data centers are in a cloud computing environment. In FIG. 6, user computer 304 is attached via network 52 to a data center 302. The data center 302 comprises a host machine 606, where, as one example, the host machine is a server such as server 402A, or a computer such as computing systems 100 and 200 of FIGS. 1-2 (A-B) that has insufficient or no GPU resources. The host machine 606 may run one or more applications 608. In one aspect the application may be associated with a graphics device driver 610.

The graphics device driver 610, the application 608, and/or the host machine 606 may be associated with a graphics server manager 612 on a Host GPU machine 612 via a network (fiber channel, LAN, wireless, Ethernet, etc.) 611. The graphics device driver 610, the application 608, and/or the host machine 606 may be able to send and receive instructions and data to and from the graphics server manager 612. As one example, the graphics device driver 610, the application 608, and/or the host machine 606 may be able to send first data to the graphics server manager 612, the first data indicative of a request for GPU resources. The graphics server may send data to the graphics device driver 610, the application 608, and/or the host machine 606, the second data indicating routing for GPU instructions from The graphics device driver 610, the application 608, and/or the host machine 606.

The graphics server manager 612 may manage a first host GPU machine 614. The graphics host machine 614 may be a computer similar to computer systems 100 and 200 of FIGS. 1-2(A-B) where the computer is specialized to function as a graphics server manager. graphics server manager 612 may be able to send instructions and data to components of the GPU machine 614 and may receive information and data as a response from components of the Host GPU machine 614. The GPU host machine 614 may be specialized for GPU hosting and processing. GPU host machine 614 may comprise the graphics server manager 612, a proxy graphics application 616, a kernel 618, and GPU hardware 620. The proxy graphics application 616 may be associated with a first graphics device driver 622, and the kernel 618 may be associated with a second graphics device driver 624. The graphics device driver 622 and 624 may translate, receive, and send data and information associated with graphics processing tasks. In one embodiment, the graphics device driver 622 and 624 are selected to translate between particular GPU hardware 620 and the applications, hardware, and operating systems operation on the graphics server machine 612, the host machine 606 and/or the user computer 304.

In the embodiment FIG. 6, instructions associated with graphics processing tasks can flow through a series of layers, from the application 608 to the graphics server manager 612, to the proxy graphics application 616, to the Kernel 618, to the hardware 620. The processed information may follow the same path in reverse. While this may be effective, there may be a delay associated with sending the instructions and the processed information through back and forth through each element.

Figure 7:
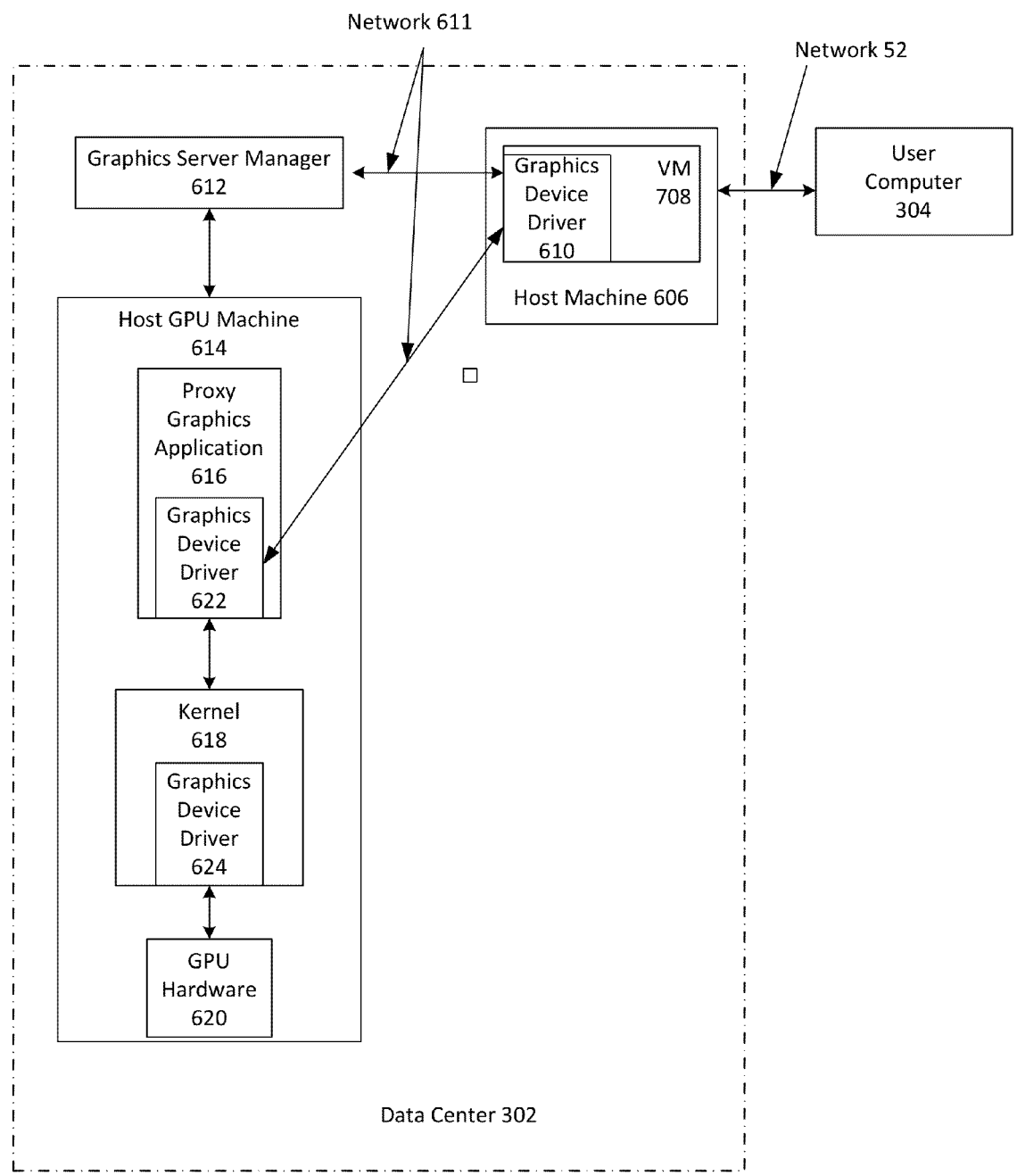
FIG. 7 depicts another example embodiment of providing GPU resources across machine boundaries.

Accordingly, in FIG. 7, the network 611 is depicted having a separate graphics server manager and further connections between the host GPU machine 614 and the graphics device driver 610, a virtual machine 708, which may be the same a virtual machine noted above with respect to FIG. 2, mounted on the host machine 606. The virtual machine 08 may be associated with a user computer 304. In an embodiment, the graphic server manager receives a request for GPU resources from the host machine, the VM 708, and/or the graphics device driver 610 mounted on the VM 708 of FIG. 8, and sends routing instructions, state instructions and the like to the host machine 606 and the host GPU machine 614. Thereafter, GPU tasks, processed information, and instructions may be sent directly between the host GPU machine 614 and the host machine 606. The graphics server manager may monitor the interactions and may perform other tasks related to the allocation of resources on a GPU such as GPU hardware 620.

Figure 8:
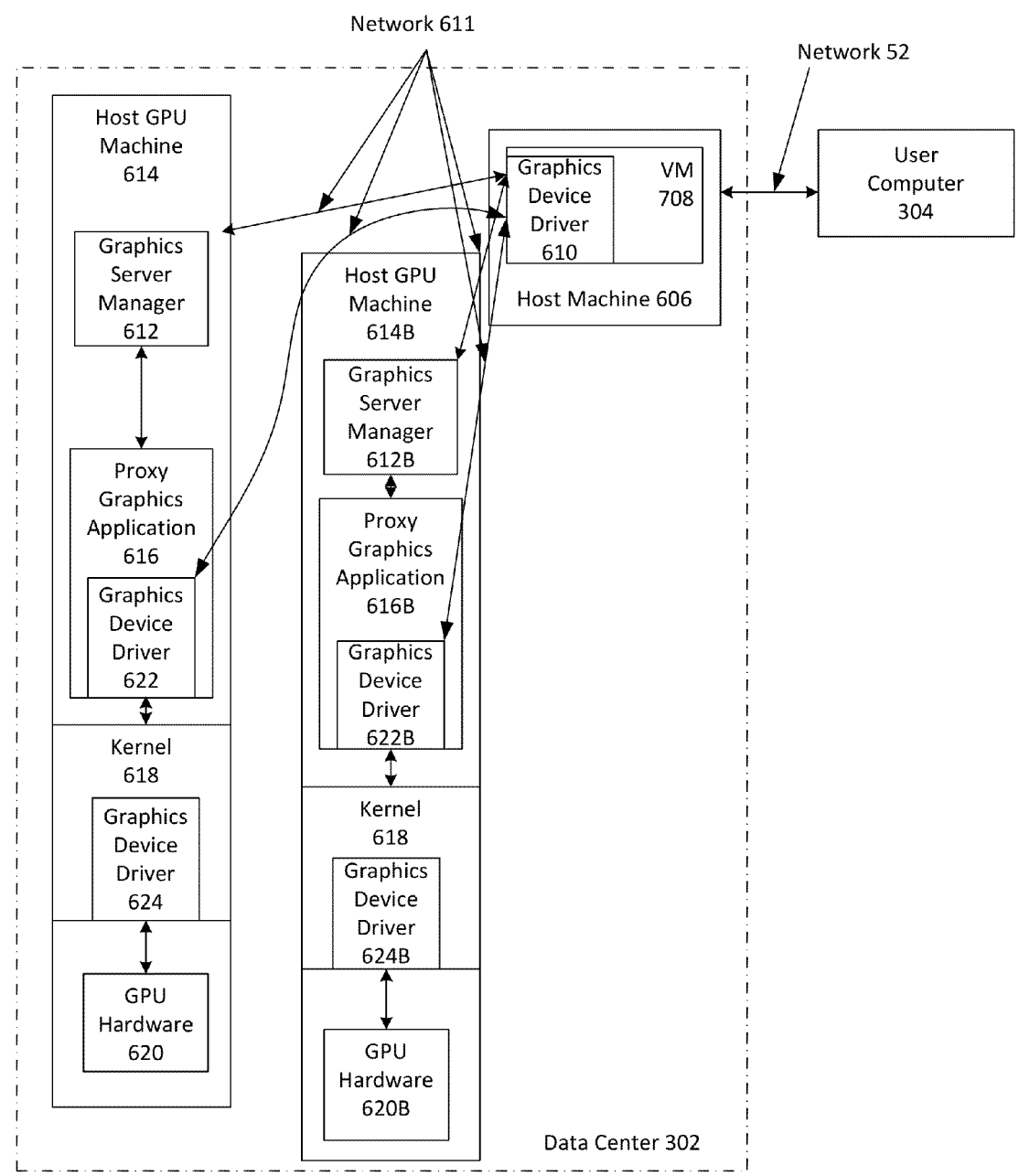
FIG. 8 depicts an example embodiment of providing GPU resources across machine boundaries using multiple GPU devices.

FIG. 8 depicts two Host GPU machines, which may be used when the resources associated with a single sent of GPU hardware 620 is insufficient to perform a GPU processing task, and also when a graphics server manager 612 migrates a part of a GPU processing task from a first host GPU machine 614 to a second host GPU machine 614B, the second host machine 614B including a second graphics server manager 612B. In such an embodiment, the graphics server processor may act to copy the state of the first host GPU machine 614 to the second host GPU machine 614B.

Figure 9:
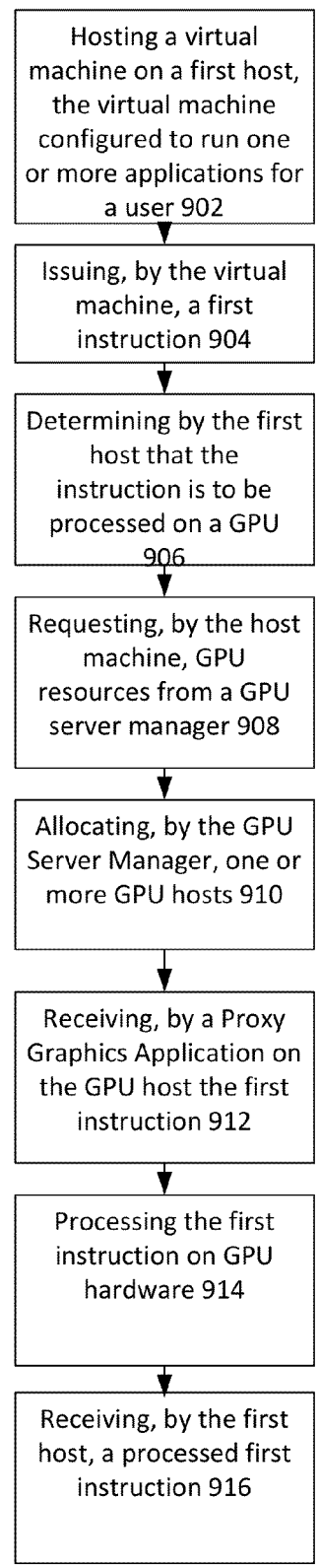
FIG. 9 depicts an example embodiment for delivering GPU resources across machine boundaries.

FIG. 9 depicts an example embodiment of a method for allocating GPU resources across machine boundaries. At step 902, a virtual machine may be hosted on a first host. The virtual machine may be configured to run one or more applications for a user. The virtual machine described in step 902 may be similar to the virtual machine described above with respect to FIG. 2, and it may be configured to run on a server similar to the server 402A described above with respect to FIG. 4. Further, as noted above, the server may have one or more of the components noted above in computing systems 100 and 200 of FIGS. 1-2(A-B). Accordingly, it will be understood that step 902 may also comprise a means for hosting a virtual machine on a first host, the virtual machine configured to run one or more applications for a user.

At step 904, providing GPU resources across machine boundaries may include issuing, by the virtual machine a first instruction. Instructions may be sent or received across local area networks and networks, such as network 52 and network 611 described above. These may be wired or wireless networks and may be connected to a Network OF such as Network I/F 53 above, or any other input/output device of a computer systems 100 and 200 of FIGS. 1-2(A-B) or servers 402. Step 904 may also be performed as a means for issuing, by the virtual machine, a first instruction.

At step 906, providing GPU resources across machine boundaries may include determining, by the first host that the instruction is to be processed on a GPU. In one embodiment, a host may determine that a particular processing task is suited for a GPU. For example, an instruction from the VM may be evaluated by the host and based on, for example, the type of processing, the difficulty in processing, the type of request and the like, the host may determine that the instruction is suited for GPU processing. Step 906 may also be performed as a means for determining by the first host that the instruction is to be processed on a GPU.

At step 908, providing GPU resources across machine boundaries may include requesting by the host machine GPU resources from a graphics server manager. The server manager may be the graphics server manager 612 depicted above with respect to FIGS. 6-8. In addition, the graphics server manager may be a server similar to sever 402B described above with respect to FIG. 4. Further, as noted above, the server may have one or more of the components noted above in computing systems 100 and 200 of FIGS. 1-2(A-B). Accordingly, it will be understood that step 908 may also comprise a means for requesting, by the host machine, GPU resources from a graphics server manager.

At step 910, providing GPU resources across machine boundaries may include allocating, by the graphics server manager, one or more GPU hosts. GPU hosts may be the host GPU machine 614 described above with respect to FIGS. 6-8. The GPU hosts may be a computer similar to computing systems 100 and 200 of FIGS. 1-2(A-B). The GPU host machine may host proxy graphics applications, GPU components, graphics device drivers, a kernel and other components described above with respect to computing systems 100 and 200 of FIGS. 1-2(A-B). Accordingly, it will be understood that step 910 may also comprise a means for allocating by the graphics server manager one or more GPU hosts.

At step 912, providing GPU resources across machine boundaries may include receiving, by a proxy graphics application on the GPU host the first instruction. The proxy graphics application may be similar to proxy graphics application 616 described above with respect to FIGS. 6-8. The proxy graphics application may be configured to send and receive instructions and data. It may be configured to determine those device drivers that are appropriate for the system configurations and states of the GPU, VM, host machines, user machine and the like. It may preserve states and route information. The proxy graphics application may execute on one or more components of a computing system similar to computing systems 100 and 200 of FIGS. 1-2(A-B). Accordingly, it will be understood that step 912 may also comprise means for receiving by a proxy graphics application on the GPU host the first instruction.

At step 914, providing GPU resources across machine boundaries may include processing the first instruction on GPU hardware. GPU hardware may can be, as one example, GPU hardware 620 described above with respect to FIGS. 6-8. As a further example, GPU hardware may be similar to graphics processing unit 112 of FIG. 2 and components of FIG. 1 including video adapter 48, processing unit 21 and the like. Accordingly, it will be understood that step 914 may also be a means for processing the first instruction on GPU hardware.

At step 916, providing GPU resources across machine boundaries may include receiving by the first host, a processed first instruction. In one embodiment, the processed instruction may be received directly from the graphics server manager, while in another embodiment; the processed instruction may be received from the host GPU machine. For example, the instruction may be received from the proxy graphics application 616 of the host GPU machine. Accordingly, it will be understood that step 916 may also be a means for receiving by the first host, a processed first instruction. As noted above, components of the computing systems 100 and 200 of FIGS. 1-2(A-B) may comprise components for sending and receiving instructions and data.

Figure 10:
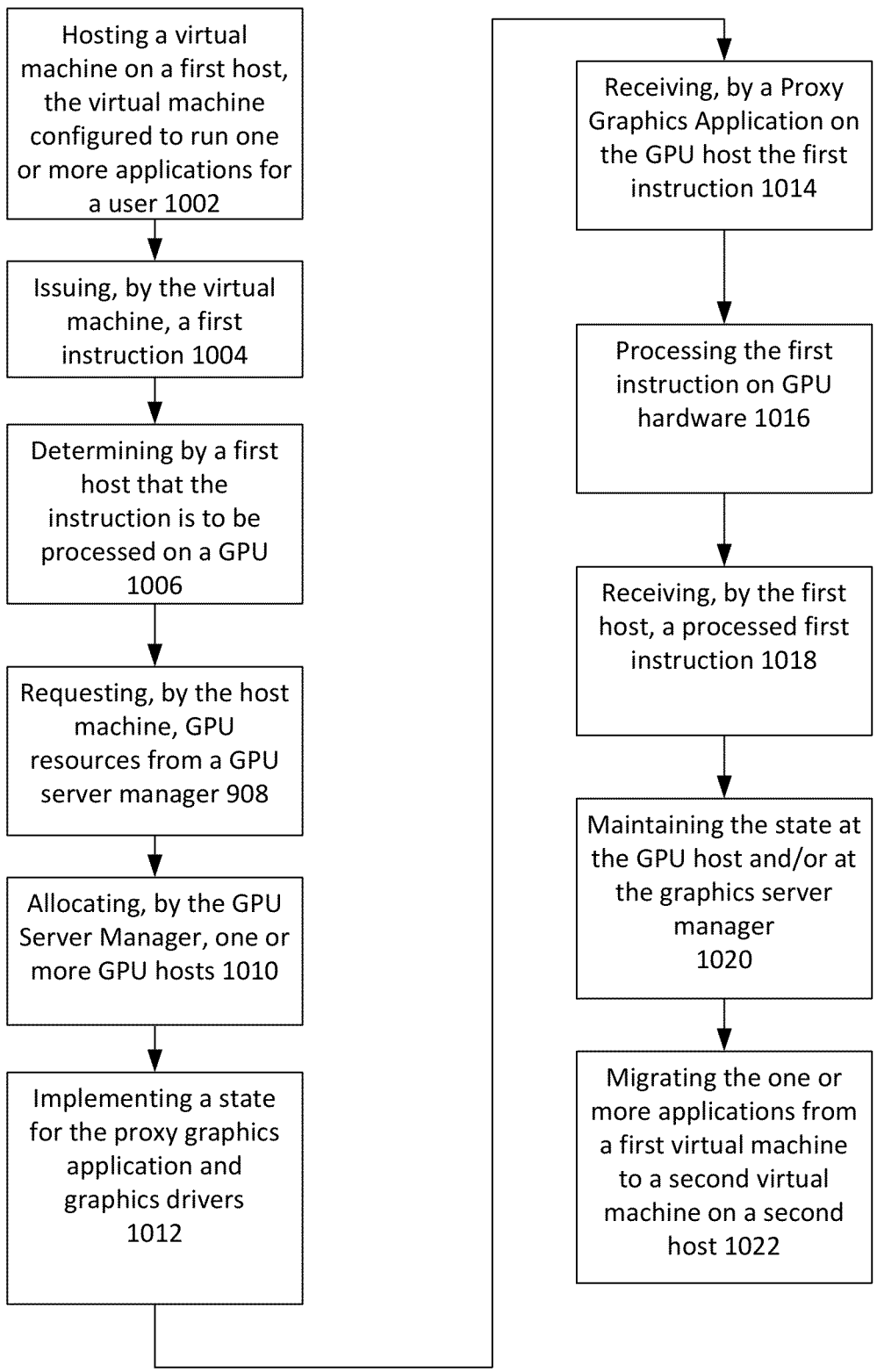
FIG. 10 depicts an example embodiment for delivering GPU resources across machine boundaries when a virtual machine migrates from a first set of one or more host machines to a second set of one or more host machines.

FIG. 10 depicts an example embodiment of migrating a virtual machine across hosts while maintaining a state of a GPU on a GPU host to reduce the likelihood of a glitch in an application. At step 1002, providing GPU resources across machine boundaries may include hosting a virtual machine on a first host, the virtual machine configured to run one or more applications for a user. In an embodiment, the virtual machine described in step 1002 may be similar to the virtual machine described above with respect to FIG. 2, and it may be configured to run on server similar to the server 402A described above with respect to FIG. 4. Further, as noted above, the server may have one or more of the components noted above in computing systems 100 and 200 of FIGS. 1-2(A-B). Accordingly, it will be understood that step 1002 may also comprise a means for hosting a virtual machine on a first host, the virtual machine configured to run one or more applications for a user.

At step 1004, providing GPU resources across machine boundaries may include issuing, by the virtual machine a first instruction. Instructions may be sent or received across local area networks and networks, such as network 52 and network 611 described above. These may be wired or wireless networks and may be connected to a Network OF such as Network I/F 53 above, or any other input/output device of a computing systems 100 and 200 of FIGS. 1-2(A-B) or servers 402. Step 1004 may also be performed as a means for issuing, by the virtual machine, a first instruction.

At step 1006, providing GPU resources across machine boundaries may include determining, by the first host that the instruction is to be processed on a GPU. In one embodiment, a host may determine that a particular processing task is suited for a GPU. For example, an instruction from the VM may be evaluated by the host and based on, for example, the type of processing, the difficulty in processing, the type of request and the like, the host may determine that the instruction is suited for GPU processing. Step 1006 may also be performed as a means for determining by the first host that the instruction is to be processed on a GPU.

At step 1008, providing GPU resources across machine boundaries may include requesting by the host machine GPU resources from a graphics server manager. The server manager may be the graphics server manager 612 depicted above with respect to FIGS. 6-8. In addition, the graphics server manager may be a server similar to sever 402B described above with respect to FIG. 4. Further, as noted above, the server may have one or more of the components noted above in computing system 100 and 200 of FIGS. 1-2(A-B). Accordingly, it will be understood that step 1008 may also comprise a means for requesting, by the host machine, GPU resources from a graphics server manager.

At step 1010, providing GPU resources across machine boundaries may include allocating, by the graphics server manager, one or more GPU hosts. GPU hosts may be the HOST GPU machine 614 described above with respect to FIGS. 6-8. The GPU hosts may be a computer similar to computing systems 100 and 200 of FIGS. 1-2(A-B). The GPU host machine may host proxy graphics applications, GPU components, graphics device drivers, a kernel and other components described above with respect to computer systems 100 and 200 of FIGS. 1-2(A-B). Accordingly, it will be understood that step 1010 may also comprise a means for allocating by the graphics server manager one or more GPU hosts.

At step 1012, providing GPU resources across machine boundaries may include implementing a state for the proxy graphics application and graphics drivers 1012. In an embodiment, a state may be a series of one or more configurations, settings, instructions, translations, data, and the like. The state may be implemented on the GPU host machine and may be associated with graphics drivers in a host machine, a GPU host, the GPU host kernel and the like. The state may configure components of the GPU host machine, which may be similar to those components described above with respect to computer systems 100 and 200 of FIGS. 1-2(A-B). It will be understood that step 1012 may also comprise a means for implementing a state for the proxy graphics application and graphics drivers.

At step 1014, providing GPU resources across machine boundaries may include receiving, by a proxy graphics application on the GPU host the first instruction. The proxy graphics application may be similar to proxy graphics application 616 described above with respect to FIGS. 6-8. The proxy graphics application may be configured to send and receive instructions and data. It may be configured to determine those device drivers that are appropriate for the system configurations and states of the GPU, VM, host machines, user machine and the like. It may preserve states and route information. The proxy graphics application may execute on one or more components of a computing system similar to computer systems 100 and 200 of FIGS. 1-2(A-B). Accordingly, it will be understood that step 1014 may also comprise means for receiving by a proxy graphics application on the GPU host the first instruction.

At step 1016, providing GPU resources across machine boundaries may include processing the first instruction on GPU hardware. GPU hardware may can be, as one example, GPU hardware 620 described above with respect to FIGS. 6-8. As a further example, GPU hardware may be similar to graphics processing unit 112 of FIG. 2 and components of FIG. 1 including video adapter 48, processing unit 21 and the like. Accordingly, it will be understood that step 1016 may also be a means for processing the first instruction on GPU hardware.

At step 1018, providing GPU resources across machine boundaries may include receiving by the first host, a processed first instruction. In one embodiment, the processed instruction may be received directly from the graphics server manager, while in another embodiment; the processed instruction may be received from the host GPU machine. For example, the instruction may be received from the proxy graphics application 616 of the host GPU machine. Accordingly, it will be understood that step 1018 may also be a means for receiving by the first host, a processed first instruction. As noted above, components of the computer systems 100 and 200 of FIGS. 1-2(A-B) may comprise components for sending and receiving instructions and data.

At step 1020, providing GPU resources across machine boundaries may include maintaining the state at the GPU host and/or at the graphics server manager. The GPU host and/or the graphics server manager may include one or more memories which may store the state of a GPU for a particular VM or application running on a host. As such, if a VM or application is migrated from a first host to a second host, the state can be maintained in memory so that the GPU does not need to mount the state from the beginning, rather it is maintained. Step 1020 may also comprise means for maintaining the state at the GPU host and/or at the graphics server manager.

At step 1022, providing GPU resources across machine boundaries may include migrating the one or more applications from a first virtual machine to a second virtual machine on a second host. In one embodiment, migrating from a first host to a second host may include migration module that copies, dismounts, and the mounts a virtual machine on a second set of computers. In general, the migration may be done in any manner known in the art. Step 1022 may also comprise means for migrating the one or more applications from a first virtual machine to a second virtual machine on a second host 1022.

What is claimed:

1. A method for providing graphics processing unit (GPU) resources, the method comprising:
   processing a request from an application operating on a virtual machine comprising a first system to perform at least one GPU operation;
   sending data associated with the performance of at least one GPU operation to a Virtual graphics driver on the virtual machine to a separate system comprising a GPU for processing of the data by the GPU on the separate system, wherein the separate system mounts a state corresponding to the virtual machine and maintains the state between two or more GPU processing tasks, the GPU processing tasks comprising at least one operation;
   receiving processed data from the separate system after the at least one GPU operation is performed; and
   providing an indication to the application that the at least one GPU operation is completed.

2. The method of claim 1 wherein the separate system comprises a graphics server manager.

3. The method of claim 1 wherein the separate system comprises a proxy graphics application to process the data on the separate system with the GPU.

4. The method of claim 1 wherein a first GPU processing task of the two or more processing tasks is received from the virtual machine on a processor, and wherein a second GPU processing task of the two or more processing tasks is received from the virtual machine on a another processor of the system.

5. The method of claim 1 wherein the application is a remote desktop session.

6. The method of claim 1 wherein the virtual machine comprises a remote desktop session for a client.

7. A data center comprising:
   one or more host servers in communication with one or more graphics server managers;
   a first virtual machine hosted on the one or more host servers; and
   a plurality of graphics processing unit (GPU) hosts in communication with the one or more graphics server managers and in communication with the one or more host servers,
   one or more processing units associated with the one or more host servers configured to determine, based on the requirements of the first virtual machine, to send a GPU processing task to the plurality of GPU hosts allocated by the one or more graphics server managers, the plurality of GPU host configured to mount a state corresponding to the first virtual machine, and the plurality of GPU hosts configured to perform the GPU processing task and to send a processed GPU task to the one or more host servers, wherein the state is maintained between two or more GPU processing tasks.

8. The data center of claim 7 wherein the first virtual machine comprises a remote desktop session for a client computer.

9. The data center of claim 7 wherein the processed GPU task is sent from the one or more graphics server managers to the one or more host servers.

10. The data center of claim 7 wherein the processed GPU task is sent from the plurality of GPU hosts to the one or more host servers.

11. The data center of claim 7 wherein a first GPU processing task of the two or more processing tasks is received from the first set of one or more host processors, and wherein a second GPU processing task of the two or more processing tasks is received from the virtual machine on a second set of one or more processing units.

12. A computer readable storage device having stored thereon instructions that when executed by one or more processors comprising a data center, cause the one or more processors to perform the steps of:
   processing a request from an application operating on a virtual machine comprising a first system to perform at least one GPU operation;
   sending data associated with the performance of at least one GPU operation from a virtual graphics driver on the virtual machine to a separate system comprising a GPU for processing of the data by the GPU on the separate system, wherein the separate system mounts a state corresponding to the virtual machine and maintains the state between two or more GPU processing tasks, the GPU processing tasks comprising at least one operation;
   receiving processed data from the separate system after the at least one GPU operation is performed; and
   providing an indication to the application that the at least one GPU operation is completed.

13. The computer readable storage medium of claim 12 wherein the virtual machine hosts a remote desktop session.

* * * * *